United States Patent
Tsao et al.

(10) Patent No.: US 9,064,470 B2
(45) Date of Patent: Jun. 23, 2015

(54) LIQUID CRYSTAL DISPLAY PANEL

(71) Applicant: AU Optronics Corp., Hsin-Chu (TW)

(72) Inventors: Kuo-Sheng Tsao, Hsin-Chu (TW);
Ching-Sheng Cheng, Hsin-Chu (TW);
Chih-Hung Shih, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 232 days.

(21) Appl. No.: 13/726,596

(22) Filed: Dec. 25, 2012

(65) Prior Publication Data

US 2014/0015739 A1 Jan. 16, 2014

(30) Foreign Application Priority Data

Jul. 13, 2012 (TW) .............................. 101125374 A

(51) Int. Cl.
*G02F 1/1343* (2006.01)
*G09G 3/36* (2006.01)
*G02F 1/1337* (2006.01)
*G02F 1/1333* (2006.01)

(52) U.S. Cl.
CPC .. *G09G 3/3648* (2013.01); *G02F 2001/134372* (2013.01); *G02F 1/133707* (2013.01); *G02F 1/13439* (2013.01); *G02F 2001/133397* (2013.01); *G02F 2001/134318* (2013.01); *G02F 2201/121* (2013.01)

(58) Field of Classification Search
USPC ........................................ 349/141, 143–144
See application file for complete search history.

(56) References Cited

U.S. PATENT DOCUMENTS

| | | | |
|---|---|---|---|
| 6,646,706 B2 | 11/2003 | Lim et al. | |
| 6,816,222 B2 * | 11/2004 | Ono et al. | 349/143 |
| 7,511,780 B2 * | 3/2009 | Onogi et al. | 349/39 |
| 7,636,144 B2 * | 12/2009 | Horiguchi et al. | 349/141 |
| 8,049,855 B2 | 11/2011 | Tanaka | |
| 2003/0123012 A1 * | 7/2003 | Yanagawa et al. | 349/141 |
| 2009/0122247 A1 * | 5/2009 | Chang | 349/139 |
| 2009/0323005 A1 * | 12/2009 | Ota | 349/143 |
| 2011/0187950 A1 * | 8/2011 | Matsushima et al. | 349/33 |
| 2011/0194061 A1 | 8/2011 | Yoso | |

FOREIGN PATENT DOCUMENTS

| | | |
|---|---|---|
| CN | 102147549 A | 8/2011 |
| JP | H10301141 A | 11/1998 |
| TW | 509813 | 11/2002 |
| TW | 200938921 | 9/2009 |

* cited by examiner

*Primary Examiner* — Hoan C Nguyen
(74) *Attorney, Agent, or Firm* — Winston Hsu; Scott Margo

(57) ABSTRACT

A liquid crystal display panel includes a substrate, gate lines, data lines, pixel electrodes, an insulating layer, patterned common electrodes and connection lines. Each pixel electrode includes a transparent electrode. The insulating layer covers the pixel electrodes. The patterned common electrodes are disposed on the insulating layer. Each patterned common electrodes includes a plurality of electrode branches, and at least one slit disposed between two adjacent electrode branches. The patterned common electrode includes a transparent electrode. The connection line is disposed on the insulating layer, and each connection line is in contact with and electrically connects to the patterned common electrodes of two adjacent sub-pixel regions.

9 Claims, 8 Drawing Sheets

LIQUID CRYSTAL DISPLAY PANEL

BACKGROUND OF THE DISCLOSURE

1. Field of the Disclosure

The present disclosure relates to a liquid crystal display panel, and more particularly, to a liquid crystal display panel utilizing connection lines with low resistance to provide electrical connection between the common electrodes of two adjacent sub-pixel regions.

2. Description of the Prior Art

With the improvement in liquid crystal display (LCD) technique, LCD panel has been prevalently used in consumer electronic products such as flat panel TVs, laptop PCs, and mobile phones. To improve the drawback of narrow view angle found in the conventional LCD panel, there has been proposed several kinds of wide view angle LCD panel such as fringe field switching (FFS) mode LCD panel. The FFS mode LCD panel is characterized by forming the common electrodes and the pixel electrodes on different planes/levels on an array substrate (also referred to as the thin film transistor substrate, TFT substrate). Furthermore, by forming an electrical field between the common electrodes and the pixel electrodes, the liquid crystal molecules are driven to realize wide view angle.

In the prior art, the common electrodes used in the conventional FFS mode LCD panel include transparent materials such as indium tin oxide (ITO). However, ITO possesses large resistance and thus the common signals are decayed during transmitting. Consequently, the displayed image suffers severer flicker problem in the central region of the FFS mode LCD panel than that in the peripheral region. As a result, the display quality is degraded.

SUMMARY OF THE DISCLOSURE

One of the objectives of the present disclosure is to provide a liquid crystal display panel to avoid the flicker issue.

To achieve the purposes described above, an embodiment of the present disclosure provides a liquid crystal display panel. The liquid crystal display panel includes a substrate, a plurality of gate lines, a plurality of data lines, a plurality of active devices, a plurality of pixel electrodes, an insulating layer, a plurality of patterned common electrodes, and a plurality of connection lines. The gate lines are disposed on the substrate. The data lines are disposed on the substrate and crossed with the gate lines to define a plurality of sub-pixel regions. The active devices are disposed on the substrate and respectively in each sub-pixel region. The pixel electrodes are disposed on the substrate and respectively in each sub-pixel region, and each of the pixel electrodes includes a transparent electrode. The insulating layer covers the pixel electrodes. The patterned common electrodes are disposed on the insulating layer, and each of the patterned common electrodes includes a plurality of electrode branches and at least one slit disposed between two adjacent electrode branches. Each of the patterned common electrodes includes a transparent electrode. The connection lines are disposed on the insulating layer, and each of the connection lines is in contact with and electrically connected to the patterned common electrodes of two adjacent sub-pixel regions.

These and other objectives of the present disclosure will no doubt become obvious to those of ordinary skill in the art after reading the following detailed description of the embodiment that is illustrated in the various figures and drawings.

DETAILED DESCRIPTION

To provide a better understanding of the present disclosure to users skilled in the technology of the present disclosure, embodiments are detailed as follows. The embodiments of the present disclosure are illustrated in the accompanying drawings with numbered elements to clarify the contents and effects to be achieved.

Figure 1:
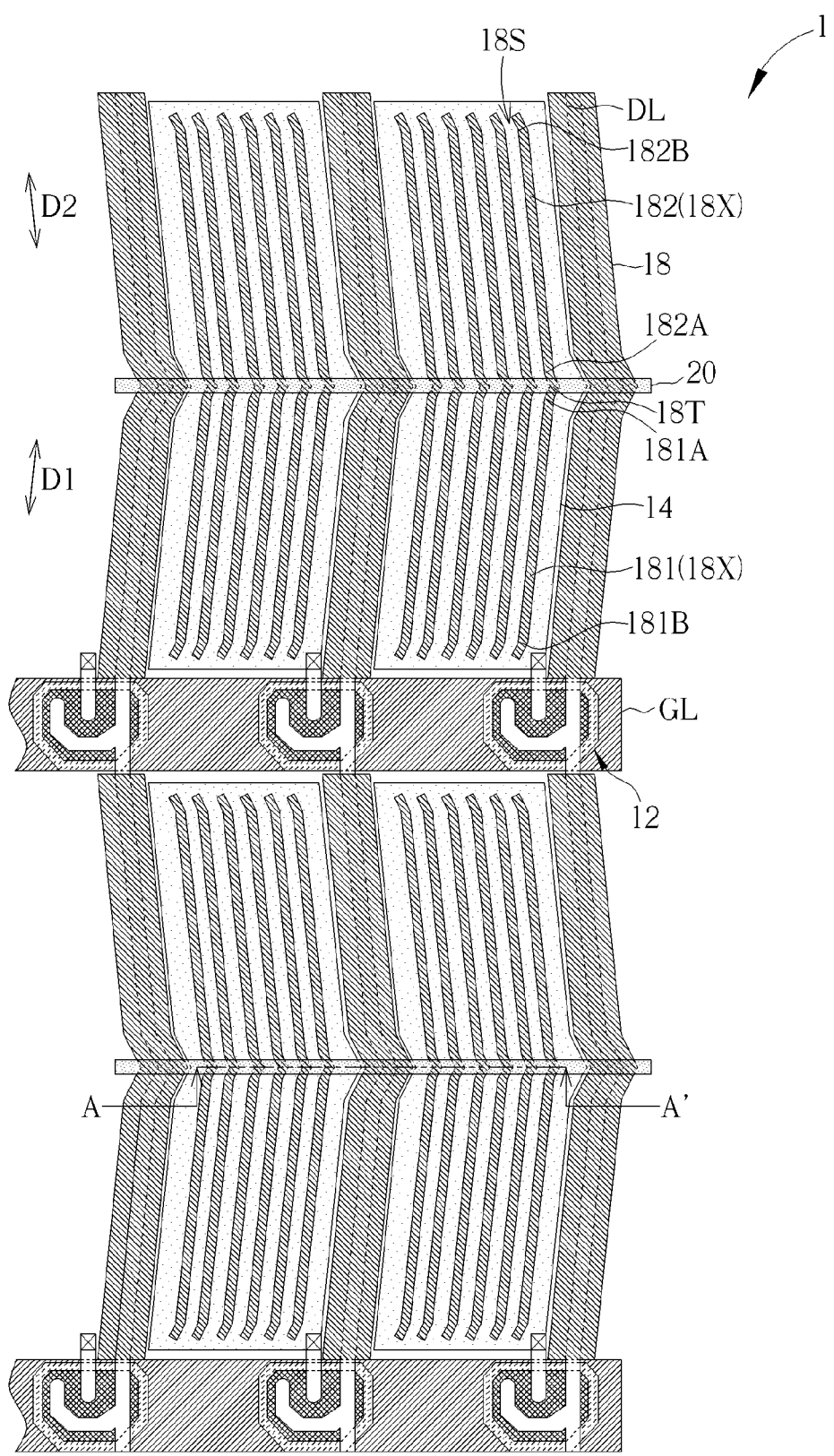
FIG. 1 is a top view of a liquid crystal display panel provided by a first embodiment of the present disclosure.
Figure 2:
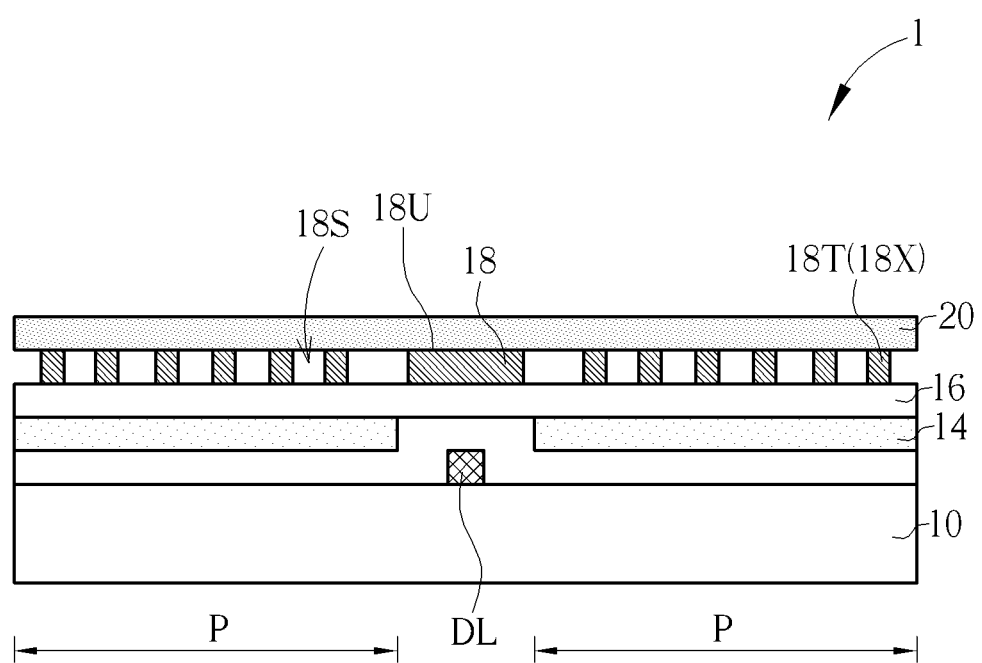
FIG. 2 is a cross-sectional view of the liquid crystal display panel taken along line A-A' in FIG. 1.

Please refer to FIG. 1 and FIG. 2, which are schematic diagrams illustrating a liquid crystal display panel provided by a first embodiment of the present disclosure, wherein FIG. 1 is a top view of the liquid crystal display panel of the first embodiment and FIG. 2 is a cross-sectional view of the liquid crystal display panel taken along line A-A' in FIG. 1. As shown in FIG. 1 and FIG. 2, the liquid crystal display panel 1 of the present embodiment includes a substrate 10 (not shown in FIG. 1), a plurality of gate lines GL, a plurality of data lines DL, a plurality of active devices 12, a plurality of pixel electrodes 14, an insulating layer 16 (not shown in FIG. 1), a plurality of patterned common electrodes 18, and a plurality of connection lines 20. The substrate 10 is a transparent substrate exemplarily including a rigid substrate such as glass substrate or quartz substrate, or including a flexible substrate such as plastic substrate. The gate lines GL and the data lines DL are disposed on the substrate 10, and the gate lines GL and the data lines DL are crossed to define a plurality of sub-pixel regions P. The gate lines GL and the data lines DL can be made of different conductive layers. Exemplarily, the gate lines GL can be made of a first metal layer (metal 1, M1) while the data lines DL can be made of a second metal layer (metal 2, M2), but not limited to this. For example, each of the data lines DL can be constructed by electrically connecting first data line sections and second data line sections in series. The first data line sections do not overlap with the gate lines GL and can be made of the first metal layer. The second data line sections overlap with the gate lines GL and can be made of the second metal layer or another metal layer. The active devices 12 are disposed on the substrate 10 and respectively in each sub-pixel region P. The active devices 12 are used to control pixels of the liquid crystal display panel 1 and can be realized by, for example but not limited to, a thin film transistor. The pixel electrodes 14 are planar electrodes disposed on the substrate 10 and respectively in the sub-pixel regions P. The pixel electrodes 14 are electrically connected to the active devices 12, respectively. Each of the pixel electrodes 14 includes a transparent electrode and materials used to form the transparent electrode can be indium tin oxide (ITO) or other transparent conductive materials. The insulating layer 16 covers the pixel electrodes 14. The insulating layer 16 can be a single-layered insulating layer or a multi-layered insulating layer, and can be made of inorganic and/or organic materials. The patterned common electrodes 18 are disposed on the insulating layer 16. Specifically speaking, in each of the sub-pixel regions P, the patterned common electrode 18 is overlapped with the pixel electrode 14 while in the sub-pixel regions P of adjacent columns, the patterned common electrode 18 is overlapped with the data lines DL. Each of the patterned common electrodes 18 includes a transparent electrode, and materials used to form the transparent electrodes can be ITO or other transparent conductive materials. The patterned common electrodes 18 and the pixel electrodes 14 are electrically isolated from each other by the insulating layer 16. Each of the patterned common electrodes 18 includes a plurality of electrode branches 18X and at least one slit 18S disposed between two adjacent electrode branches 18X. The connection lines 20 are disposed on the insulating layer 16, and each of the connection lines 20 is in contact with and electrically connected to the patterned common electrodes 18 of two adjacent sub-pixel regions P. The connection lines 20 preferable includes metal connection lines and can be made of a third metal layer (metal 3, M3), but not limited to this. Exemplarily, the connection lines 20 can be made of alloy or other conductive material with resistance lower than the patterned common electrodes 18.

In the present embodiment, the electrode branches 18X of the patterned common electrodes 18 include a first group of electrode branches 181 being parallel to each other and extended along a first direction D1, and a second group of electrode branches 182 being parallel to each other and extended along a second direction D2 that is different from the first direction D1. A first terminal 181A of the first group of electrode branch 181 is connected to a corresponding first terminal 182A of the second group of electrode branches 182 to form a turning point 18T. Second terminals 181B of the first group of electrode branches 181 are not connected to each other, and second terminals 182B of the second group of electrode branches 182 are not connected to each other, either. Consequently, transmittance is improved. Furthermore, each of the connection lines 20 is in contact with the turning points 18T of the patterned common electrodes 18 in the same row, therefore the patterned common electrodes 18 of the same row are electrically connected to each other by the connection lines 20. Since the connection lines 20 are made of low resistance materials such as metal instead of high resistance material such as ITO, the connection lines 20 efficaciously diminish common signal decay during transmitting, and thus the flicker issue is mitigated. Additionally, since the transmittance of the liquid crystal layer at the areas corresponding to the turning points 18T of the patterned common electrodes 18 is extremely low, the connection lines 20 are intended to be disposed correspondingly to the turning points 18T of the patterned common electrodes 18 of the same row for mitigating the adverse impact to the transmittance. In other words, the connection lines 20 are provided to lower the resistance and to diminish the common signal decay during transmitting without impacting the transmittance.

As shown in FIG. 2, in the present embodiment, the connection lines 20 are disposed on the patterned common electrodes 18 and in contact with a top surface 18U of the patterned common electrodes 18, but not limited to this.

It should be noted that the liquid crystal display panel provided by the present disclosure is exemplarily embodied by the fringe field switching (FFS) mode LCD panel, but not limited thereto. The following description will detail the different embodiments of the liquid crystal display panel in the present disclosure. To simplify the description, the identical components in each of the following embodiments are designated by the identical numerals. In order to compare more easily the differences between the embodiments, the following description will detail the dissimilarities among different embodiments and the identical features will not be redundantly described.

Figure 3:
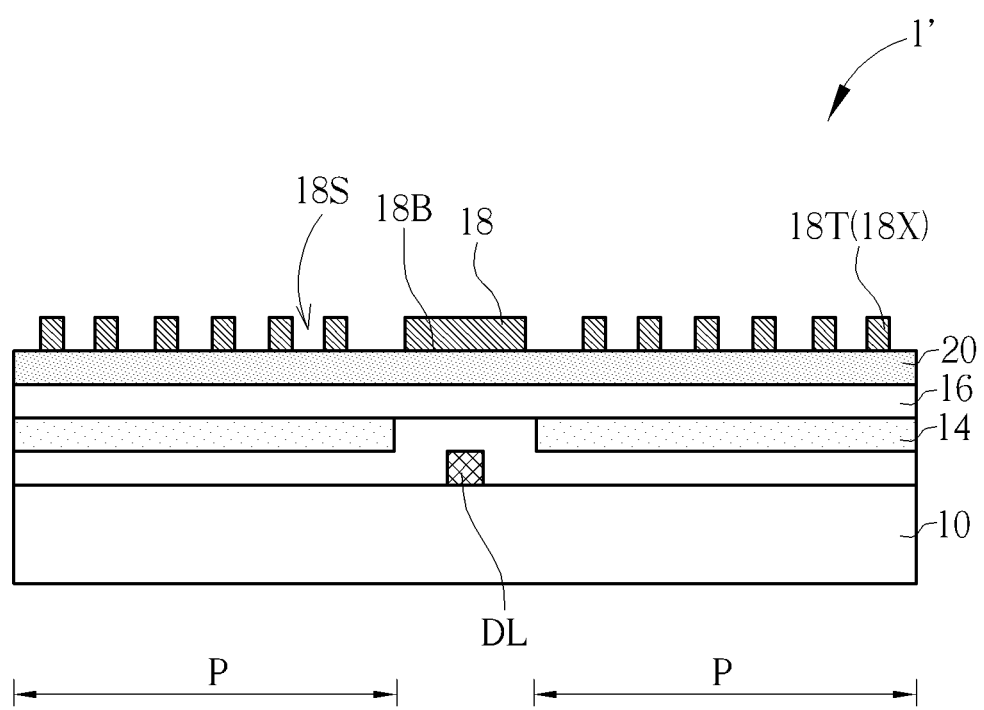
FIG. 3 is a schematic diagram illustrating a liquid crystal display panel provided by a modification to the first embodiment of the present disclosure.

Please refer to FIG. 3, which is a schematic diagram illustrating a liquid crystal display panel provided by a modification to the first embodiment of the present disclosure. In order to clearly describe the structure of the present disclosure, FIG. 1 and FIG. 3 can be referred together. As shown in FIG. 3, according to the modification, the connection lines 20 of the liquid crystal display panel 1' are disposed between the insulating layer 16 and the patterned common electrodes 18, and in contact with a bottom surface 18B of the patterned common electrodes 18.

Figure 4:
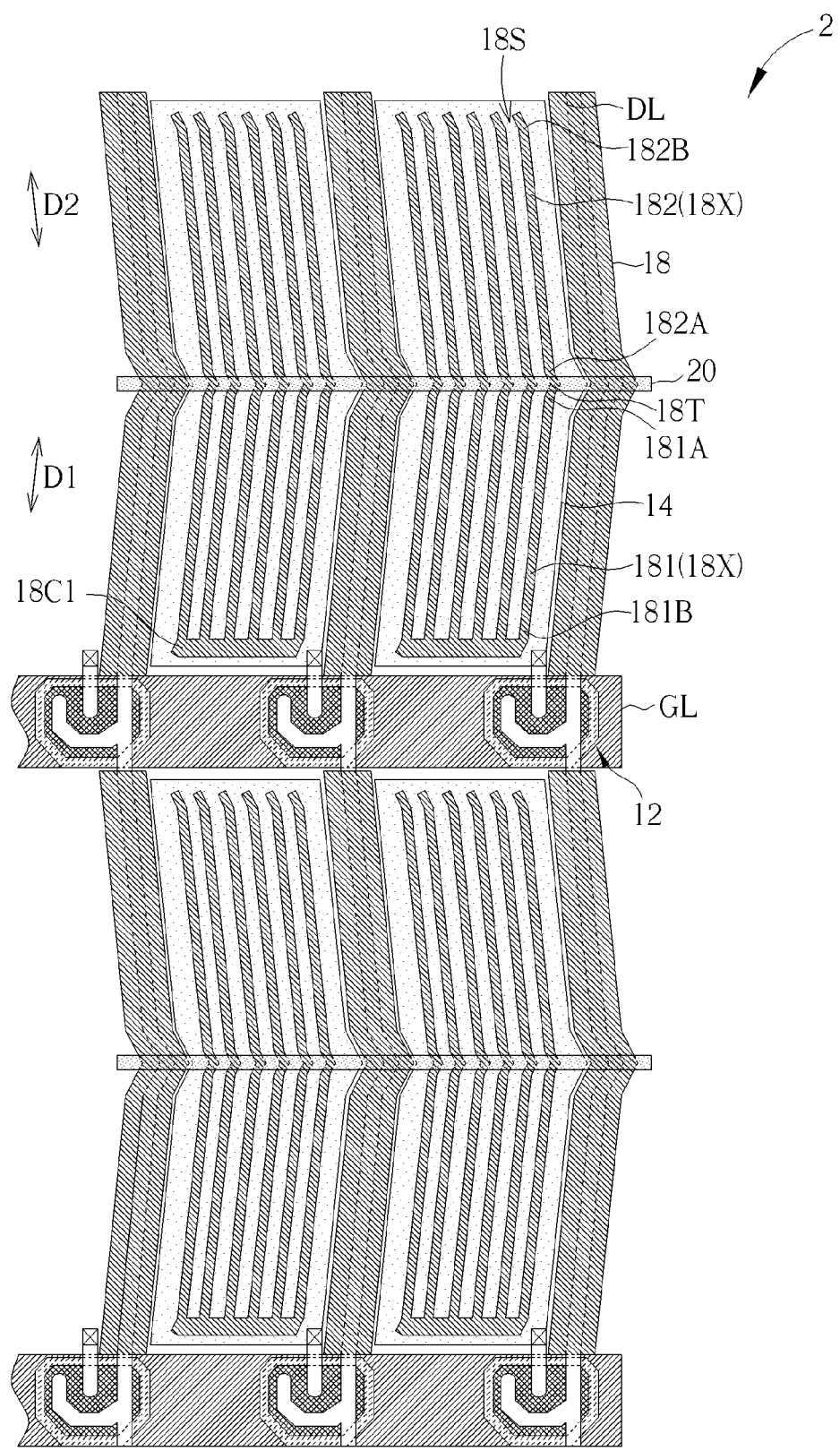
FIG. 4 is a schematic diagram illustrating a liquid crystal display panel provided by a second embodiment of the present disclosure.

Please refer to FIG. 4, which is a schematic diagram illustrating a liquid crystal display panel provided by a second embodiment. As shown in FIG. 4, in the present embodiment, the patterned common electrodes 18 of the liquid crystal display panel 2 further includes a first connection electrode 18C1 electrically connected to the second terminals 181B of the first group of electrode branches 181. The first connection electrodes 18C1 and the patterned common electrodes 18 can be made of the same transparent conductive layer, but not limited to this.

Figure 5:
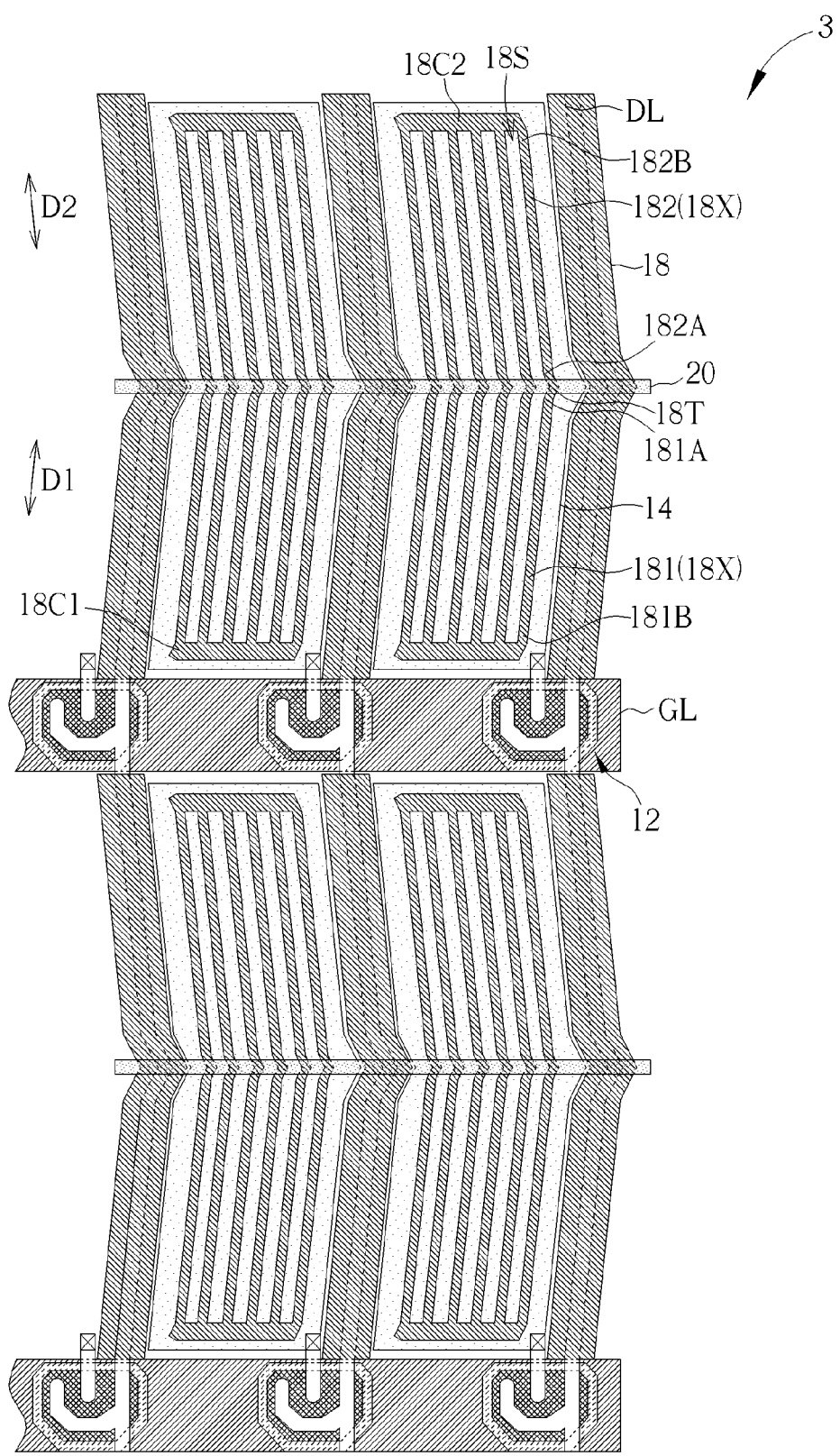
FIG. 5 is a schematic diagram illustrating a liquid crystal display panel provided by a third embodiment.

Please refer to FIG. 5, which is a schematic diagram illustrating a liquid crystal display panel provided by a third embodiment. As shown in FIG. 5, in the present embodiment, the patterned common electrodes 18 of the liquid crystal display panel 3 further include a first connection electrode 18C1 electrically connected to the second terminals 181B of the first group of electrode branches 181, and a second connection electrode 18C2 electrically connected to the second terminals 182B of the second group of electrode branches 182. The first connection electrodes 18C1, the second connection electrodes 18C2 and the patterned common electrodes 18 can be made of the same transparent conductive layer, but not limited to this.

Figure 6:
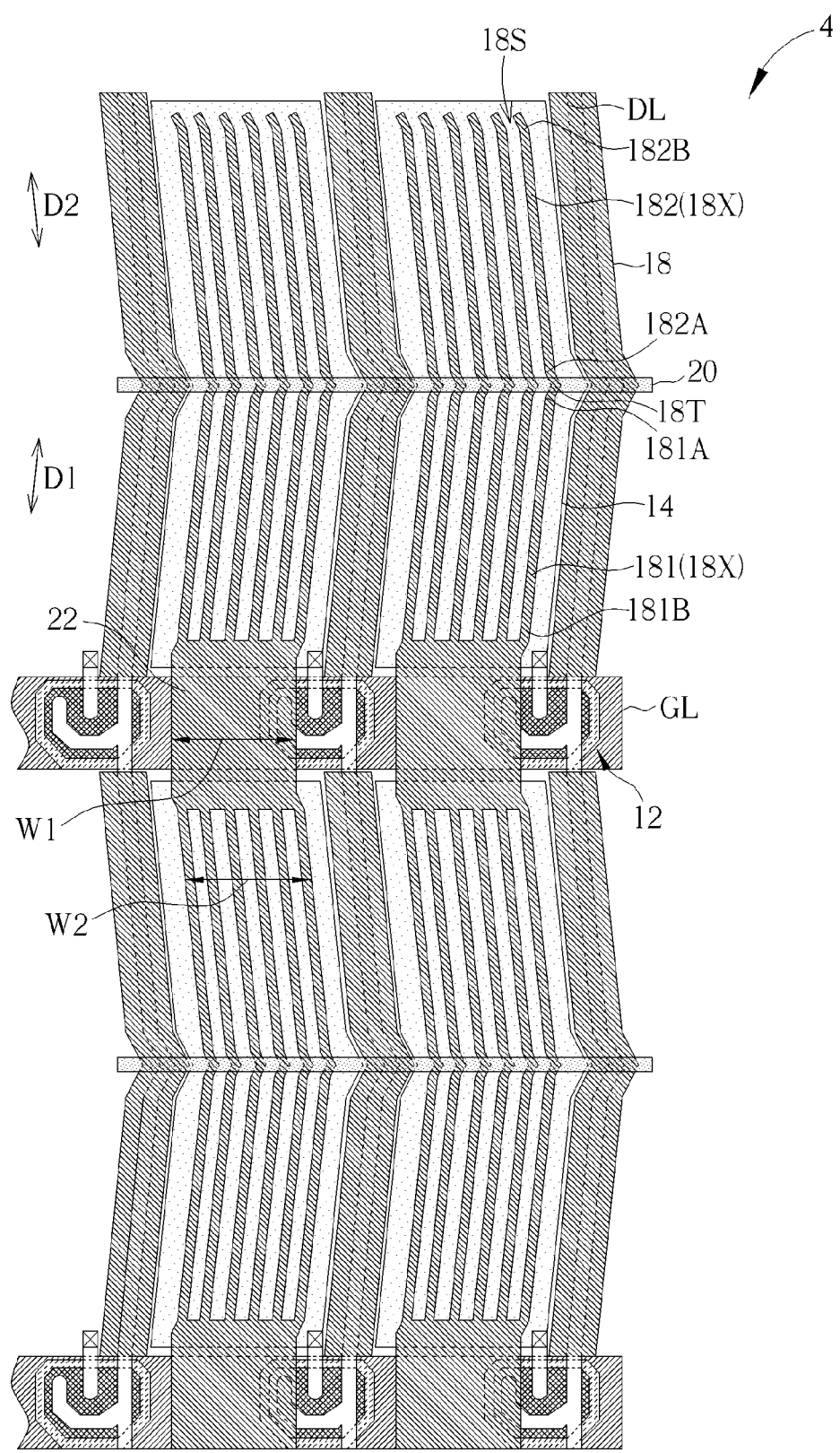
FIG. 6 is a schematic diagram illustrating a liquid crystal display panel provided by a fourth embodiment.

Please refer to FIG. 6, which is a schematic diagram illustrating a liquid crystal display panel provided by a fourth embodiment. As shown in FIG. 6, in the present embodiment, the liquid crystal display panel 4 further includes a plurality of bridge electrodes 22. Each of the bridge electrodes 22 is electrically connected to two adjacent patterned common electrodes 18 in the same column, while each of the connection lines 20 is electrically connected to the patterned common electrodes 18 of the sub-pixel regions P in the same row. The bridge electrodes 22 and the patterned common electrodes 18 can be made of the same transparent conductive layer, but not limited to this. In the present embodiment, a width W1 of the bridge electrodes 22 is substantially equal to a width W2 of the patterned common electrodes 18.

Figure 7:
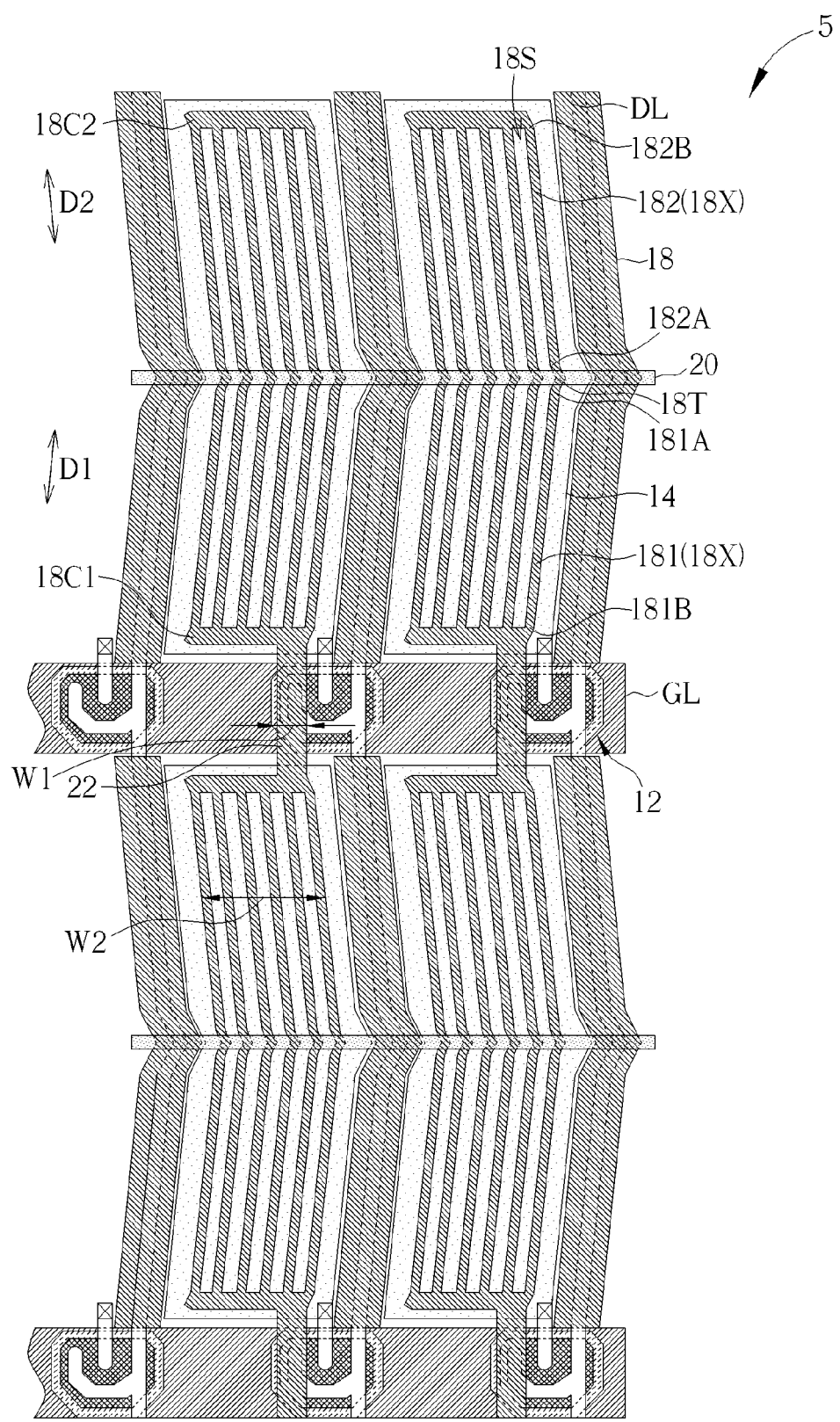
FIG. 7 is a schematic diagram illustrating a liquid crystal display panel provided by a modification to the fourth embodiment of the present disclosure.

Please refer to FIG. 7, which is a schematic diagram illustrating a liquid crystal display panel provided by a modification to the fourth embodiment of the present disclosure. As shown in FIG. 7, in the liquid crystal display panel 5 provided by the modification, the width W1 of the bridge electrodes 22 is smaller than the width W2 of the patterned common electrodes 18. Furthermore, the bridge electrodes 22 are disposed substantially corresponding to the active devices 12.

Figure 8:
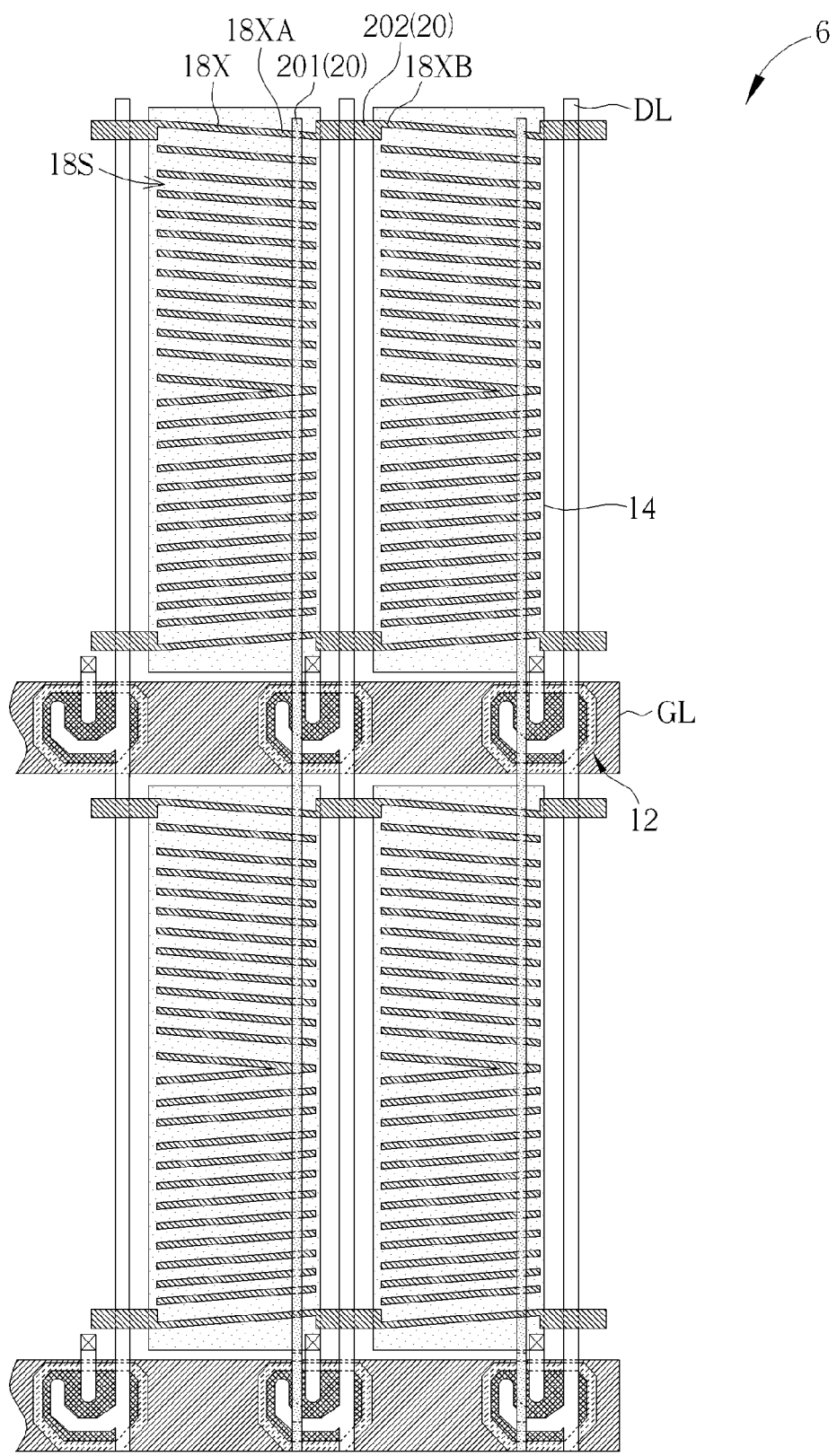
FIG. 8 is a schematic diagram illustrating a liquid crystal display panel provided by a fifth embodiment.

Please refer to FIG. 8, which is a schematic diagram illustrating a liquid crystal display panel provided by a fifth embodiment. As shown in FIG. 8, according to the liquid crystal display panel 6 provided by the present embodiment, the electrode branches 18X of each patterned common electrode 18 are extended along different directions to form a fan shape. Furthermore, each connection line 20 includes a plurality of first connection lines 201 and a plurality of second connection lines 202. The first connection lines 201 are extended along a column direction and disposed in the sub-pixel regions P. Each of the first connection lines 201 is electrically connected to the electrode branches 18X in the corresponding sub-pixel region P. For example, each of the first connection lines 201 is in contact with the first terminals 18XA of the electrode branches 18X in the same sub-pixel region P. The first connection lines 201 preferably include metal connection lines and can be made of, for example but not limited to, the third metal layer. The first connection lines 201 can also be made of alloy or other conductive materials with resistance lower than the patterned common electrodes 18. The second connection lines 202 are extended along a row direction and disposed between two adjacent the sub-pixel regions P in the same row. Thereby the patterned common electrodes 18 of the two adjacent sub-pixel regions P are electrically connected. For example, each of the second connection lines 202 is in contact with the first connection line 201 of one of the two adjacent sub-pixel regions P and electrically connected to the second terminals 18XB of the electrode branches 18X of the other sub-pixel region P. Each of the second connection lines 202 can include a transparent connection line. The second connection lines 202 and the patterned common electrodes 18 can be made of the same transparent conductive layer, but not limited to this. Exemplarily, the second connection lines 202 can include metal connection lines, and can be made of the third metal layer. Furthermore, in the present embodiment, the first connection lines 201 are disposed to pass through the sub-pixel regions P in the same column, thereby the patterned common electrodes 18 in the same column are electrically connected, but not limited to this.

According to the embodiments and modification provided by the present disclosure, the relative positions of all connection lines (including the connection lines 20, the first connection lines 201 and the second connection lines 202) and the patterned common electrodes 18 can be embodied as shown in FIG. 2: the connection lines 20 are disposed on the patterned common electrodes 18 and in contact with the top surface 18U of the patterned common electrodes 18. The relative positions of all connection lines and the patterned common electrodes 18 can also be embodied as shown in FIG. 3: the connection lines 20 is formed between the insulating layer 16 and the patterned common electrodes 18, and in contact with the bottom surface 18B of the patterned common electrodes 18.

To summarize the above descriptions, the liquid crystal display panel provided by the present disclosure utilizes the connection lines with low resistance to connect the patterned common electrodes of adjacent sub-pixel regions, therefore the common signal decay during transmitting is diminished and thus the flicker issue is mitigated.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A liquid crystal display panel, comprising:
a substrate;
a plurality of gate lines, disposed on the substrate;
a plurality of data lines, disposed on the substrate, the gate lines and the data lines being crossed to define a plurality of sub-pixel regions;
a plurality of active devices, disposed on the substrate and in the sub-pixel regions, respectively;
a plurality of pixel electrodes, disposed on the substrate and in the sub-pixel regions respectively, wherein each of the pixel electrodes comprises a transparent electrode;
an insulating layer, covering the pixel electrodes;
a plurality of patterned common electrodes, disposed on the insulating layer, wherein each of the patterned common electrodes comprises a plurality of electrode branches and at least one slit disposed between two adjacent electrode branches, and each of the patterned common electrodes comprises a transparent electrode, and wherein the electrode branches comprise a first group of electrode branches disposed parallel to each other and extended along a first direction, and a second group of electrode branches disposed parallel to each other and extended along a second direction that is different from the first direction, a first terminal of each of the first group of electrode branches and a first terminal of the corresponding second group of electrode branches are connected to form a turning point, the turning points are arranged along an extension direction of the gate lines, and the second terminals of the first group of electrode branches are not connected to each other; and
a plurality of connection lines, disposed on the insulating layer, wherein each of the connection lines is in contact with and electrically connected to the patterned common electrodes of two adjacent sub-pixel regions, each of the connection lines is in contact with the turning points of the patterned common electrodes disposed in the same row, and the connection lines do not overlap the gate lines in a vertical projection direction.

2. The liquid crystal display panel of claim 1, wherein the connection line comprises a metal connection line.

3. The liquid crystal display panel of claim 2, wherein the connection line is disposed on the patterned common electrodes and in contact with a top surface of the patterned common electrode.

4. The liquid crystal display panel of claim 2, wherein the connection line is disposed between the insulating layer and the patterned common electrode, and in contact with a bottom surface of the patterned common electrode.

5. The liquid crystal display panel of claim 1, wherein the second terminals of the second group of electrode branches are not connected to each other.

6. The liquid crystal display panel of claim 1, wherein each of the pixel electrodes is a full-surfaced electrode.

7. The liquid crystal display panel of claim 1, further comprising a plurality of bridge electrodes, wherein each of the connection lines is in contact with and electrically connected to the patterned common electrodes disposed in the same row, and each of the bridge electrodes is electrically connected to two adjacent patterned common electrodes in the same column.

8. The liquid crystal display panel of claim 7, wherein a width of the bridge electrode is smaller than a width of the patterned common electrode, and the bridge electrode is disposed substantially corresponding to the active device.

9. The liquid crystal display panel of claim 7, wherein the bridge electrode comprises a transparent electrode.

* * * * *